United States Patent [19]

Kudo et al.

[11] Patent Number: 4,981,526
[45] Date of Patent: Jan. 1, 1991

[54] COMPOSITION FOR BRAZING ALUMINUM OR ALUMINUM ALLOY AND AN ALUMINUM OR ALUMINUM ALLOY PRODUCT

[75] Inventors: Hajime Kudo, Susonoshi; Hitoshi Saito, Numazushi; Ken Toma, Mishimashi, all of Japan

[73] Assignee: Mitsubishi Aluminum Co., Ltd., Tokyo, Japan

[21] Appl. No.: 441,169

[22] Filed: Nov. 22, 1989

[30] Foreign Application Priority Data

Nov. 29, 1988 [JP] Japan ............................... 63-299415
Sep. 19, 1989 [JP] Japan ................................. 1-240671

[51] Int. Cl.$^5$ ............................................. B23K 35/34
[52] U.S. Cl. ....................................... 148/25; 148/22; 148/23; 148/24
[58] Field of Search ................................... 148/22-25

[56] References Cited

U.S. PATENT DOCUMENTS 2,897,106 7/1959 Morrison ............................... 148/23
4,645,119 2/1987 Haramaki ............................. 148/23

Primary Examiner—Peter D. Rosenberg
Attorney, Agent, or Firm—Morrison Law Firm

[57] ABSTRACT

A composition for brazing aluminum or aluminum alloy characterized in that said composition contains aluminum alloy powder for brazing and thermoplastic acryl-based resin binder which is so volatile as to volatilize before being carbonized at a brazing temperature and said resin binder of 0.1 to 50 parts is used for aluminum alloy powder of 100 parts. When this technological idea was applied to brazing with a brazing material of aluminum alloy powder such as, for example, Al-Si, a preferable result of brazing could be obtained.

19 Claims, 2 Drawing Sheets

COMPOSITION FOR BRAZING ALUMINUM OR ALUMINUM ALLOY AND AN ALUMINUM OR ALUMINUM ALLOY PRODUCT

BACKGROUND OF THE INVENTION

The present invention relates to a composition for brazing aluminum or aluminum alloy.

It has been said that torch brazing with a brazing rod is sufficiently applicable to brazing a member made of aluminum or aluminum alloy (hereinafter simply referred to as aluminum alloy) where the aluminum alloy member has a simple shape and requires joints at only a few points.

However, the tubes and fins of a heat exchanger made of aluminum alloy have many joints combined with a complex shape. This complicates the use of torch brazing. In such case, a vacuum brazing method, an inert atmosphere brazing method and a flux brazing method which respectively use a brazing sheet which is clad in advance with a brazing material have been suggested.

Though the above-mentioned brazing method using a brazing sheet is extremely effective for equipment such as a heat exchanger which has a complex shape and many joints, it is wasteful because parts of the device, not necessary for brazing, are clad with brazing material. This unnecessarily increases cost.

In addition, it has been clarified that, since the whole surface is clad with a brazing material, brazing metal erodes to the base metal during heating for brazing thus causing the base metal to be deformed.

DISCLOSURE OF THE INVENTION

As a result of the progress of research and developement from the above point of view, the inventor has determined that the use of brazing metal powder would be effective as a means for supplying a brazing material to parts having complex shapes without requiring a brazing sheet. In this case, the inventor has discovered that it is effective to use brazing metal powder in a mixture with a resin binder.

However, the types of resin available for this purpose are limited.

In the Patent Disclosure Gazette No. 160869-1981 disclosed during the research process of the present invention, a brazing method for aluminum alloy by which fluoride-based flux powder and Zn powder having the substantial particle size of 1 to 200 μm are suspended in a weight ratio 4 to 9 and 6 to 1 in a liquid. Carboxymethyl cellulose of 0.5 weight % or less is added as a binder to the liquid. A suspension containing this carboxymethyl cellulose is applied to the surface of a material made of aluminum alloy. The material is dried. Then the material is heated in an inert gas at a temperature lower than the melting point of the material and higher than the melting points of Zn and the fluoride-based flux to melt the brazing material. When this technological idea was applied to brazing with a brazing material of aluminum alloy powder such as, for example, Al-Si, a satisfactory brazing was obtained. This failure was also contrary to expectation.

In Patent Publication Gazette No. 31274-1983, a metallic paste composition for brazing is proposed which contains a which contains metallic powder, a water soluble high molecular compound having a carboxyl group in its side chain, and water is.

In the detailed description, it is disclosed that a thermosetting acryl-based resin (which should not be a thermoplastic resin) is available as the water-soluble high molecular compound and copper or nickel powder is used as the metallic powder. When this technological idea was applied for brazing with aluminum alloy powder such as, for example, Al-Si, that is, a thermosetting acryl-based resin proposed in this technological idea was used as the resin binder, satisfactory brazing was obtained. This failure was also contrary to expectation.

In other words, it has been suggested that a resin may be used as the binder with a powder type brazing material. Various types of resins which had been suggested were applied to brazing for which aluminum alloy powder such as, for example, Al-Si was used. None produced satisfactory brazing It has been suggested that this failure results from the brazing material containing a number of different metallic components. Therefore, the inventors repeated numerous tests to find a resin which could be used as the binder for a brazing material containing aluminum alloy such as Al-Si and Al-Zn and having the brazing temperature of approximately 480° to 630° C. They discovered that a thermoplastic acryl-based resin which is volatile enough to volatilize before being carbonized at the brazing temperature (it should not be thermosetting acryl-based resin) is satisfactory as binder when aluminum alloy powder is used as the brazing material.

The inventors found that excellent brazing characteristics can be obtained when a thermoplastic acryl-based resin which is homopolymer or copolymer composed of acrylic acid, methacrylic acid, acrylic ester, methacylic acid ester, etc. with the molecular weight of 1,000 to 1,000,000, was used.

If the quantity of the resin binder is too small, the brazing material powder cannot be uniformly supplied. If the quantity of the resin binder is too large, the brazing characteristics deteriorate. From this, it is clear that the ratio of the resin binder to aluminum alloy powder should be within a specified range.

The present invention was achieved based on such knowledge as described above and provides a composition for brazing aluminum alloy and an aluminum alloy product which can easily brazed even though an object to be brazed has many joints or a complex shape.

An object of the present invention is achieved by a composition for brazing aluminum or aluminum alloy characterized wherein the composition contains aluminum alloy powder for brazing and a thermpolastic acryl-based resin binder which is so volatile as to volatilize before being carbonized at the brazing temperature. The resin binder is mixed at from 0.1 to 50 parts to 100 parts of aluminum alloy powder.

In addition, the present invention is implemented by an aluminum or aluminum alloy product characterized in that a composition containing 100 parts of aluminum alloy powder for brazing and 0.1–50 parts of thermoplastic acryl-based resin binder which is so volatile as to volatilize before being carbonized at a brazing temperature, is applied to the surface of an aluminum or aluminum alloy material.

In the composition for brazing aluminum alloy and the aluminum alloy product, the said composition for brazing preferably further contains a flux for brazing and, in this case, 0.1 to 150 parts (weight) of flux is mixed with 100 parts of aluminum alloy powder. Moreover, in the composition for brazing aluminum alloy and the aluminum alloy product, a preferable average particle size of the aluminum alloy powder in the said composition for brazing is approximately 10 to 200 μm.

If the diameter of this alloy powder particle is smaller than about 10 μm, the surface area of the particles is large, the quantity of oxide increases, and brazing is degraded. Also, handling of such a find powder is difficult If the diameter of alloy powder particle is excessively larger than about 200 μm, it cannot be applied uniformly to the surface of material. This is of sharply bent parts. Therefore the average particle size should preferably be from about 10 to 200 μm. Alloy powder in the above particle size range shows less variation in composition and is easily melted at the brazing temperature, thus ensuring excellent brazing.

The molecular weight of the resin binder in the composition for brazing is preferably 1,000 to 1,000,000.

The binder is preferably a thermoplastic resin which is polymerized using at least a kind of monomer which is selected from a group of acrylic acid, acrylic ester, methacrylic acid and methacrylic acid ester.

The composition for brazing aluminum alloy may contain a metal such as Zn which provides a sacrificial anode property. For example, it may contain from about 0.5 to about 10 weight % Zn. A metal which provides a sacrificial anode property is optional, and may be omitted.

Aluminum alloy powder for use in brazing can be an aluminum alloy such as Al-Si, Al-Si-Mg, Al-Si-Zn and Al-Zn alloy which has a lower melting point than the aluminum alloy to be joined.

The composition for brazing aluminum alloy can be made by mixing and dispersing an aluminum alloy powder and a thermoplastic acryl-based resin in water or organic solvents (10 to 200 parts of water is used for 100 parts of aluminum alloy powder to preferably have a viscosity of 5,000 cps or less), and this mixed and dispersed solution of approximately 5 to 500 g/m² (quantity after drying) may be brushed or sprayed on the parts such as tube and bent parts of fins of a heat exchanger to be brazed. Then the assembly is heated at, for example, 480° to 630° C. by vacuum brazing, flux brazing, etc..

In case of brazing with a flux, if a chloride or fluoride-based flux component is mixed and dispersed in the said solution, the following flux application process can be eliminated and as much flux as required for brazing can be added. Therefore excessive quantities of the flux will not be used. This reduces costs.

Chloride-based fluxes such as KCl-LiCl-based ZnCl$_2$-based fluxes and fluoride-based flux such as KF-AlF$_3$-based flux can be used.

EXAMPLE 1

A tube 1 is made by extruding AA 1050 alloy. Then a water solution is formed by mixing Al-10 wt % Si alloy powder having an average particle size of approximately 50 μm and polybutyl acrylate (thermoplastic) having a molecular weight of several ten thousands at the ratio of 95:5 (weight ratio) and adding 50 parts of water to 100 parts of this mixture. The mixture is applied to the extruded tube 1 and the tube is dried. Thus the surface of Al-10 wt % of that tube 1 is coated with a brazing alloy powder film formed of Si alloy powder bonded with polybutyl acrylate.

Figure 1:
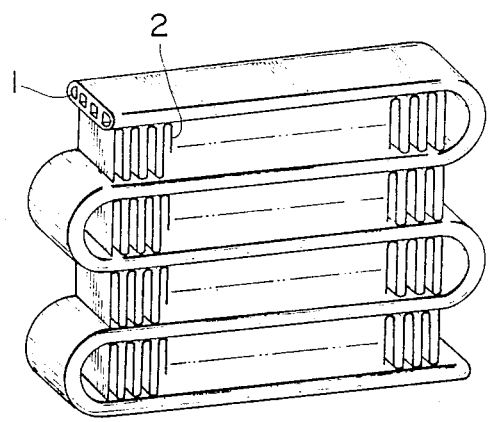
FIG. 1 is an explanatory diagram showing the assembled condition of the extruded tube 1 and fin 2 and FIG. 2 is a photograph showing the condition of the aluminum alloy plate which has been rubbed after the brazing composition was applied and dried.

Fin 2 is formed by corrugating AA 7072 alloy. Tube 1 is applied 100 g/m 2 (quantity after drying) of the composition for brazing. The fin 2 and the tube 1 are assembled as shown in FIG. 1. solution is applied.

After drying, brazing is carried out at 600° C. for 5 minutes in a nitrogen gas atmosphere.

EXAMPLE 2

In Example 1, the fluoride-based flux is mixed in advance in a mixture of Al-10 wt% Si alloy brazing powder and polybutyl acrylate so that the weight ratio of brazing powder/flux is 99/1. Brazing was similarly carried out except for later application of the fluoride-based flux.

EXAMPLE 3

In Example 2, the brazing was similarly carried out with the exception that brazing alloy powder of Al-10 wt % Si-2 wt % Zn was used.

EXAMPLE 4

In Example 3, the brazing was similarly carried out with the exception that a chloride-based flux was used instead of the fluoride-based flux, the weight ratio of brazing powder/flux was 60/40 and brazing was conducted at 600° C. for 5 minutes in an air atmosphere.

EXAMPLE 5

In Example 1, the brazing was similarly carried out using acrylate copolymer (thermoplastic) having a molecular weight of the several hundred thousands instead of polybutyl acrylate used in Example 1.

COMPARATIVE EXAMPLE 1

A 0.1 mm thick brazing sheet made up by the core metal AA, 7072 with 10% both side cladding of AA 4045 was formed as fins by corrugating it. These fins were assembled with a AA 1050 alloy extruded tube. A fluoride-based flux was applied to this assembly, and brazing was carried out at 600° C. for 5 minutes in a nitrogen gas atmosphere.

COMPARATIVE EXAMPLE 2

In Example 1, the brazing was similarly carried out with the exception that the weight ratio of polybutyl acrylate/brazing powder was 40/60.

COMPARATIVE EXAMPLE 3

In Example 1, the brazing was similarly carried out using carboxymethyl cellulose instead of polybutyl acrylate.

COMPARATIVE EXAMPLE 4

In Comparative Example 3, the brazing was similarly carried out with the exception that the weight ratio of carboxymethyl cellulose/brazing powder 0.5/99.5.

COMPARATIVE EXAMPLE 5

In Example 1, the brazing was similarly carried out using sodium polyacrylate (thermosetting type resin) instead of polybutyl acrylate.

COMPARATIVE EXAMPLE 6

In Comparative Example 5, the brazing was similarly carried out with the exception that the weight ratio of sodium polyacrylate/brazing powder is 1/99.

COMPARATIVE EXAMPLES 7-12

In Example 1, the brazing was similarly carried out using polyvinyl chloride (Comparative Example 7), epoxy resin (Comparative Example 8), polyethylene oxide (Comparative Example 9), alkaline salt of polyolefin (Comparative Example 10), polyisobutylene (Comparative Example 11) and starch (Comparative Example 12), respectively instead of polybutyl acrylate.

COMPARATIVE EXAMPLE 13

In Example 1, the brazing was similarly carried out using NBA-107c made by Fusion Inc. instead of the water solution containing Al-10 wt % Si alloy powder and polybutyl acrylate having the molecular weight of several ten thousand.

Properties

Table 1 shows the brazing effects, deformation of fins and maximum pitting corrosion depth of the extruded tube after CASS tests for 720 hours.

A solution containing aluminum alloy brazing powder and a binder resin was applied to an aluminum alloy plate and the plate was dried, then this aluminum alloy plate was formed to inspect its forming characteristics. The results of inspection are also shown in Table 1.

TABLE 1

|  | Brazing effect | Deformation of fins | Corrosion depth of tube | Forming characteristics |
|---|---|---|---|---|
| Example 1 | Excellent | Not observed | 0.25 mm | Excellent |
| Example 2 | " | " | 0.26 mm | " |
| Example 3 | " | " | 0.13 mm | " |
| Example 4 | " | " | 0.15 mm | " |
| Example 5 | " | " | 0.25 mm | " |
| Comparative example 1 | Good | Largely deformed | 0.31 mm | — |
| Comparative example 2 | Bad | Not observed | — | Good |
| Comparative example 3 | " | " | — | " |
| Comparative example 4 | Good | " | — | Bad |
| Comparative example 5 | Bad | " | — | Good |
| Comparative example 6 | " | " | — | " |
| Comparative example 7 | " | " | — | " |
| Comparative example 8 | " | " | — | " |
| Comparative example 9 | " | " | — | " |
| Comparative example 10 | " | " | — | " |
| Comparative example 11 | Good | " | 0.28 mm | Not formable |
| Comparative example 12 | Good | " | 0.26 mm | Not formable |
| Comparative example 13 | Good | " | 0.25 mm | Not formable |

Figure 2:
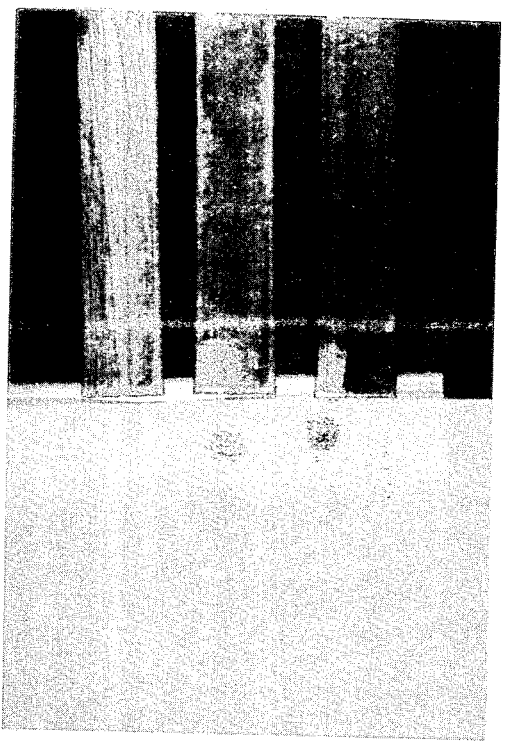

The photograph in FIG. 2 shows the condition of the aluminum alloy plate which was rubbed at its surface after the brazing composition which was used in said Example 1 and Comparative Examples 11 and 13 has been applied on the surface of said aluminum alloy plate and said plate was dried at 110° C. for five minutes. In case of the example used in Example 1, the brazing composition was not wiped off whereas the brazing composition was wiped off in cases of Comparative Examples 11 and 13. This indicates that various processing such as stacking or bending can be done after applying and drying the brazing composition in accordance with the present invention. In the case of Comparative Examples 11 and 13, however, it is indicated that such processings causes the brazing composition to be removed and such stacking or bending cannot be carried out.

In FIG. 2, Example 1 is shown at the left side, Comparative Example 11 at the center and Comparative Example 13 at the right side, respectively.

What is claimed is:

1. A composition for brazing aluminum or aluminum alloy comprising an aluminum alloy powder for brazing: a thermoplastic acryl-based resin binder: said binder being so volatile as to volatilize before being carbonized at a brazing temperature: and said resin binder being in a proportion of from 0.1 to 50 parts of aluminum alloy powder of 100 parts.

2. A composition for brazing aluminum or aluminum alloy in accordance with claim 1, further comprising a flux for brazing in a proportion of 0.1 to 150 parts to 100 parts for aluminum alloy powder.

3. A composition for brazing aluminum or aluminum alloy in accordance with claim 1, further comprising a metallic powder which provides sacrificial anode property in a proportion of about 10 parts to 100 parts of said aluminum alloy powder.

4. A composition for brazing aluminum or aluminum alloy in accordance with claim 1, further comprising 10 to 200 parts of water as a solvent to 100 parts of said aluminum alloy powder.

5. A composition for brazing aluminum or aluminum alloy in accordance with claim 1, wherein aluminum alloy powder has an average particle size of 10 to 200 μm.

6. A composition for brazing aluminum or aluminum alloy in accordance with claim 1, wherein a molecular weight of said resin binder is 1,000 to 1,000,000.

7. A composition for brazing aluminum or aluminum alloy in accordance with claim 1, wherein said resin binder is polymerized using at least a kind of monomer which is selected from the group of acrylic acid, acrylic ester, methacrylic acid and methacrylic acid ester.

8. A composition for brazing aluminum or aluminum alloy in accordance with claim 4, wherein the viscosity of said composition is 5,000 cps or less.

9. An aluminum or aluminum alloy product comprising a mixture of 100 parts of aluminum alloy powder for brazing and 0.1-50 parts of thermoplastic acryl-based resin binder; said resin binder being so volatile as to volatilize before being carbonized at a brazing temperature; said mixture being applied on the surface of aluminum or aluminum alloy material.

10. An aluminum or aluminum alloy product in accordance with claim 9, further comprising a flux in a proportion of 0.1 to 150 parts to 100 parts of said aluminum alloy powder.

11. An aluminum or aluminum alloy product in accordance with claim 9, further comprising 10 to 200 parts of water as a solvent to 100 parts of said aluminum alloy powder.

12. An aluminum or aluminum alloy product in accordance with claim 9, wherein said composition for use in brazing further contains water of 10 to 200 parts as a solvent for aluminum alloy powder of 100 parts.

13. An aluminum or aluminum alloy product in accordance with claim 9, wherein the average particle size of aluminum alloy powder is 10 to 200 μm.

14. An aluminum or aluminum alloy product in accordance with claim 9, wherein the molecular weight of the resin binder is 1,000 to 1,000,000.

15. An aluminum or aluminum alloy product in accordance with claim 9, wherein said resin binder is polymerized using at least a kind of monomer which is selected from the group of acrylic acid, acrylic ester, methacrylic acid and methacrylic acid ester.

16. A composition for brazing aluminum or aluminum alloy in accordance with claim 2, further comprising 10 to 200 parts of water as a solvent to 100 parts of said aluminum alloy powder.

17. A composition for brazing aluminum or aluminum alloy in accordance with claim 3, further comprising 10 to 200 parts of water as a solvent to 100 parts of said aluminum alloy powder.

18. A composition in accordance with claim 6, wherein said resin binder is polymerized using at least a kind of monomer which is selected from the group of acrylic acid, acrylic ester, methacrylic acid and methacrylic acid ester.

19. A product in accordance with claim 14, wherein said resin binder is polymerized using at least a kind of monomer which is selected from the group consisting of acrylic acid, acrylic ester, methacrylic acid and methacrylic acid ester.

* * * * *